April 20, 1937.  A. S. DUESENBERG  2,078,067
COOLING SYSTEM FOR AUTOMOBILE ENGINES
Filed Feb. 27, 1935   2 Sheets-Sheet 1
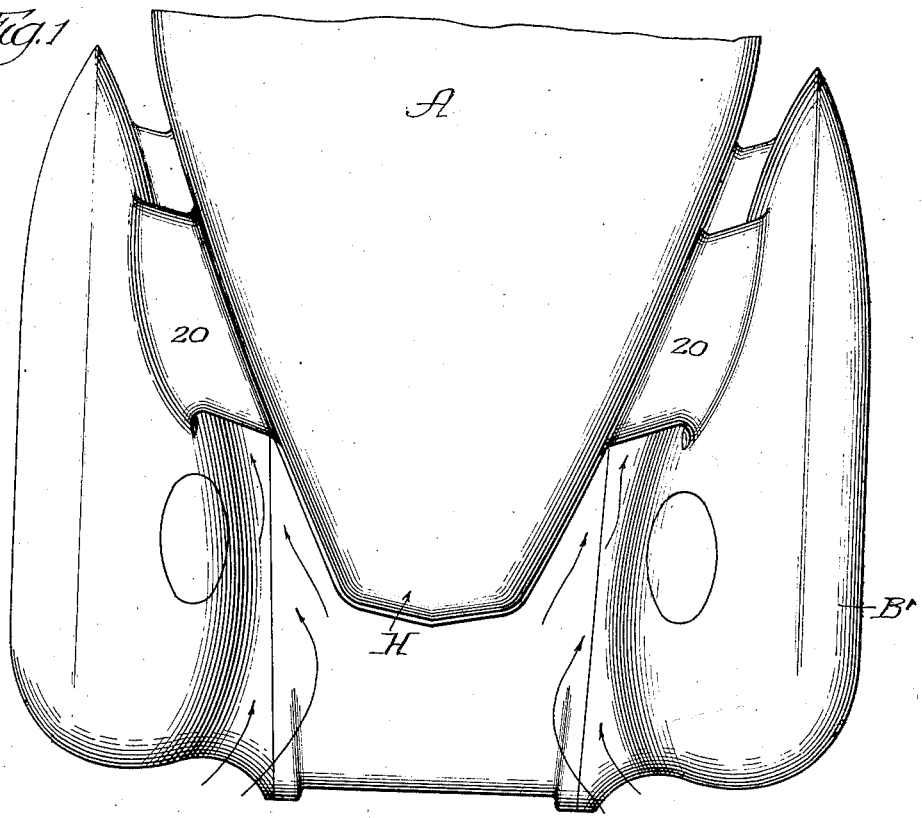
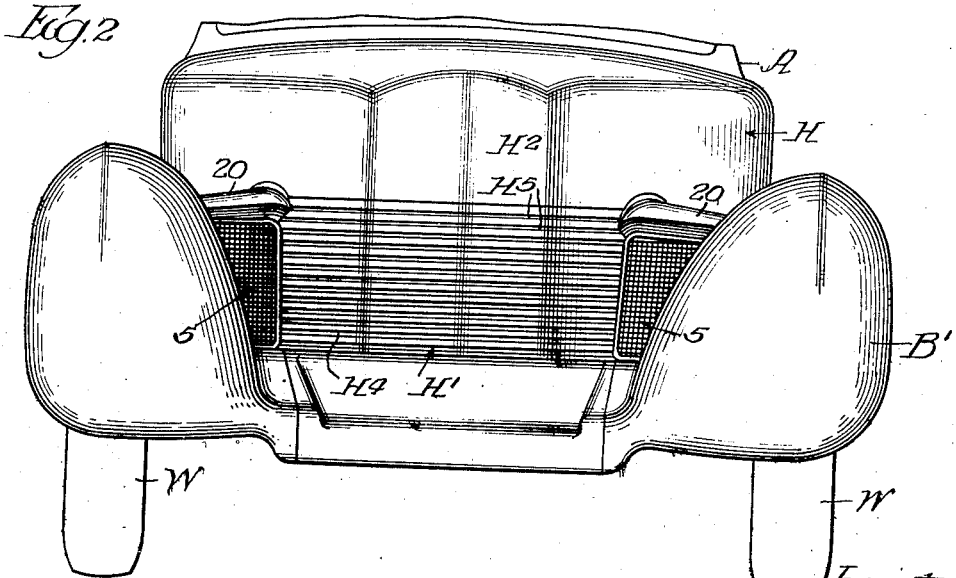

April 20, 1937. A. S. DUESENBERG 2,078,067
COOLING SYSTEM FOR AUTOMOBILE ENGINES
Filed Feb. 27, 1935 2 Sheets-Sheet 2
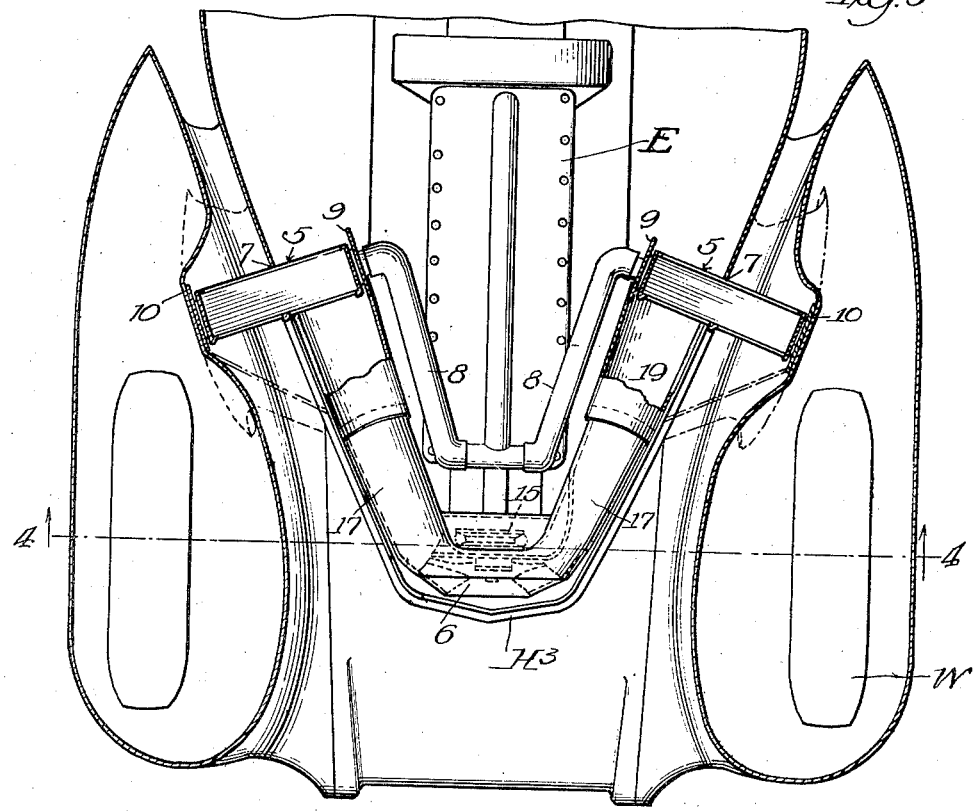
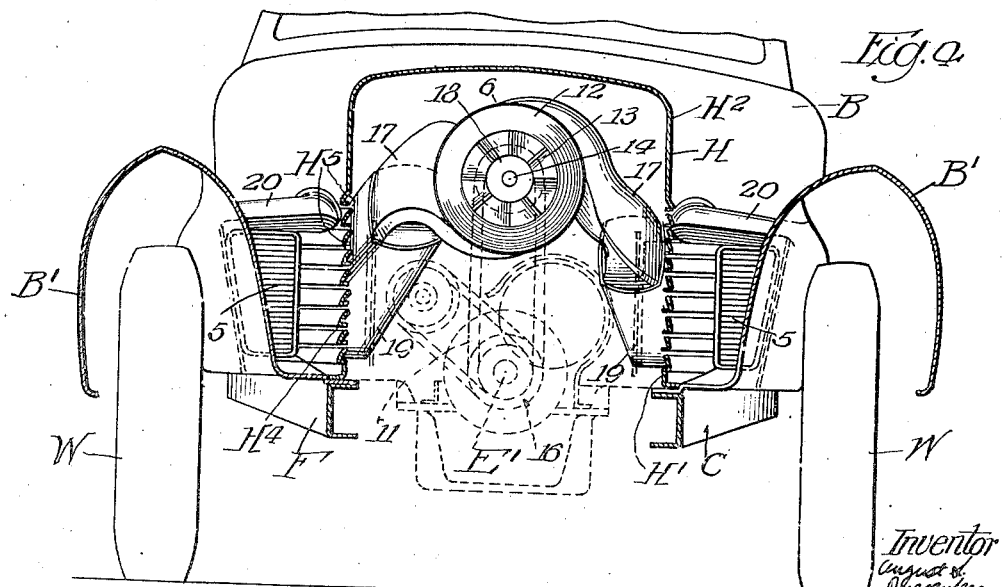

Patented Apr. 20, 1937

2,078,067

UNITED STATES PATENT OFFICE 2,078,067

COOLING SYSTEM FOR AUTOMOBILE ENGINES

August S. Duesenberg, Indianapolis, Ind., assignor to Cord Corporation, Chicago, Ill., a corporation of Delaware Application February 27, 1935, Serial No. 8,448

14 Claims. (Cl. 180—54)

The present invention relates generally to cooling systems for water jacketed internal combustion engines. More particularly the invention relates to that type of cooling system which is used in connection with an automobile engine and comprises (1) a chassis-supported radiator through which the cooling water for the engine is circulated by means of a pump; and (2) an engine driven rotary device for causing air to pass through the radiator for water cooling purposes.

One object of the invention is to provide an automobile engine cooling system of this type in which the radiator instead of being in the form of a single unit or core in front of the engine, consists of a pair of sections which are disposed on opposite sides of the engine and are so located and arranged that they are not likely to be damaged in the event of a head-on collision.

Another object of the invention is to provide an engine cooling system of the last mentioned character in which the rotary device is in the form of a blower which is positioned in front of the engine and embodies a casing having a pair of outlets whereby air under pressure is directed rearwardly for passage through the two radiator sections.

Another object of the invention is to provide an automobile engine cooling system of the type and character under consideration in which the radiator sections are mounted or supported on the chassis of the automobile so that the inner portions thereof are disposed under the hood for the engine and receive air under pressure directly from the blower and their outer portions extend between the sides of the hood and the front fenders of the automobile and are subject to air cooling during forward drive of the automobile.

Another object of the invention is to provide an engine cooling system of the type and character last mentioned which includes a pair of air foils over the outer or exterior portions of the radiator sections for directing air downwardly through said portions of the radiator sections during forward travel of the automobile.

A further object of the invention is to provide a cooling system of the aforementioned character which includes a pair of conduits for conducting air from the outlets of the blower casing so that a portion thereof flows through the inner or interior portions of the radiator sections and the remainder flows outwardly through slots or openings in the sides of the hood of the automobile and thence passes through the outer or exterior portions of the sections.

A still further object of the invention is to provide a cooling system for an automobile engine, which is generally of new and improved construction and is exceptionally efficient in operation.

Other objects of the invention and the various advantages and characteristics of the present cooling system will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a plan view of an automobile having applied to the engine thereof a water cooling system embodying the invention;

Figure 2 is a front view of the automobile showing the position and arrangement of the radiator sections of the improved cooling system;

Figure 3 is a horizontal sectional view of the engine portion of the automobile disclosing in detail the manner in which the radiator sections of the system are supported on the chassis of the automobile so that the inner portions are disposed under the hood and the outer portions extend between the sides of the hood and the front fenders; and Figure 4 is a vertical section taken on the line 4—4 of Figure 3 and showing the construction of the blower and the arrangement of the conduits between the outlets of the blower casing and the inner or interior portions of the radiator sections.

The improved cooling system is shown in the drawings in connection with an automobile A. The latter is of conventional or standard design and comprises a chassis C and a body B. The chassis consists of a frame F which supports an internal combustion engine E and embodies dirigible wheels W at its front end and traction wheels (not shown) at its rear end. The traction wheels are driven from the engine E through a driving connection consisting of a clutch, a speed reducing transmission, and differential gearing, as well understood in the art. The frame F consists of a pair of laterally spaced, channel iron bars which extend lengthwise of the automobile and support the engine E on the front ends thereof. The body B is mounted on the chassis and includes a pair of front fenders B' and a hood H. The fenders B' extend over and around the upper portions of the front or dirigible wheels W, as shown in the drawings, and are connected to the front ends of the channel iron bars of the chassis frame F. The hood H of the body surrounds and forms a closure for the engine E and consists of a fixed bottom section H' and a movable top section H². The bottom section is supported directly on the front end of the chassis C and comprises a front H³ and sides H⁴. The front H³ is located directly in front of the engine and is slightly pointed so as to direct laterally the air encountered during forward travel of the automobile. The sides H⁴ extend rearwardly from the front H³ and are spaced inwardly from the inner side walls of the fenders B'. As shown in the drawings the front and sides of the bottom section of the hood have horizontal slots H⁵ therein. These slots permit air to flow into and out of the space within the hood. The top section H² of the hood is pivoted at is rear end so that it may be swung upwardly when access is desired to the engine. It covers, when in its normal or lowered position, the upper portion of the engine E and consists of a top wall and a depending substantially U-shaped skirt. This skirt is in the nature of an upper continuation of the front and sides of the bottom section of the hood. The engine E embodies a crankshaft E' and is water jacketed for cooling purposes. Water is circulated through the jacket of the engine by means of an engine driven pump (not shown) as well understood in the art.

The cooling system serves to prevent overheating of the cooling water for the engine E and comprises a pair of radiator sections 5 and a blower 6. The blower, as hereinafter described, operates during operation of the engine E to force air through the radiator sections for water cooling purposes.

The radiator sections 5 are disposed at opposite sides of the engine E and are disposed over the front ends of the channel iron bars of the chassis frame F. They are preferably of standard construction or design and extend through openings 7 in the sides H⁴ of the bottom section of the hood. The outer portions of the radiator sections extend to the inner side walls of the front fenders B' of the body and as a result are so positioned that a portion of the air encountered by the front of the body during forward drive of the automobile passes therethrough. As shown in Figure 3 the radiator sections 5 extend substantially at right angles to the sides H⁴. Water from the jacket of the engine is pumped through pipes (not shown) into the bottom portions of the two radiator sections. From the bottom portions of the sections the water flows upwardly to the top portions of the sections and then returns to the jacket of the engine E by way of return pipes 8. The water, during travel thereof through the sections, is cooled so that it serves effectively to prevent overheating of the engine E. Vertically extending metal strips 9 and 10 serve to support or hold the radiator sections in place above the front ends of the channel iron bars of the chassis frame F. The strips 9 are in the form of hangers or straps and are applied to the inner side walls of the radiator sections. The strips 10 are also in the form of straps or hangers and are applied to the outer side walls of the radiator sections. The back faces of the radiator sections are open or exposed so as to permit air to pass or flow readily through the sections.

The blower 6 is suitably mounted between the front of the engine E and the front of the hood H. It is driven from the crankshaft of the engine by a belt 11 and comprises a casing 12 and a blade equipped rotor 13. The rotor is disposed in the casing and has a drive shaft 14 which is journalled in suitable bearings at the back of the casing and has a pulley 15. The belt 11 for driving the blower extends around the pulley 15 and a pulley 16 in the front end of the crankshaft E' of the engine and operates during drive of the engine to rotate the rotor. The casing 12 of the blower embodies a pair of diametrically opposite rearwardly extending outlets 17 and has a central opening 18 in the front face thereof. During rotation or drive of the rotor air is drawn into the casing through the central opening 18 and is thrown outwardly under pressure to the outlets 17. From these outlets the air is conducted rearwardly to a pair of sheet metal conduits 19. The latter extend between the rear ends of the casing outlets 17 and the inner or interior portions of the radiator sections 5 and operate to direct the air under pressure from the blower so that it passes for the most part through said inner or interior portions of the radiator sections for water cooling purposes. The outer side walls of the conduits have openings in registry with the rear portions of the slots H⁵ in the sides H⁴ of the bottom section of the hood H so that a portion of the air flows outwardly through the slots and passes through the outer or exterior portions of the radiator sections 5.

In addition to the radiator sections 5 and the blower 6 the cooling system comprises a pair of air foils 20. These air foils extend between and are connected to the inner side walls of the front fenders B' and the sides H⁴ of the bottom section of the hood H, and extend over, and project forwardly and rearwardly of, the outer or exterior portions of the radiator sections 5. The front portions of the air foils, that is the portions which project in front of the outer portions of the radiator sections, form with the adjacent portions of the inner side walls of the fenders and the sides H⁴ of the bottom section of the hood, a pair of pockets at the sides of the engine wherein a portion of the air encountered by the front of the automobile during forward drive is trapped so that it flows rearwardly through the outer portions of the radiator sections. The under faces of the forwardly projecting portions of the air foils are rounded or curved so as to deflect or direct the air downwardly through the exterior portions of the radiator sections. The portion of the air under pressure flowing outwardly through the slots H⁵ in the sides of the bottom section of the hood is trapped in the pockets under the projecting front portions of the air foils and between the inner side walls of the fenders and the sides H⁴ of the bottom section of the hood so that it flows together with the other trapped air rearwardly through the outer portions of the radiator sections.

During forward drive of the automobile A air flows into the hood H through the slots H⁴ in the front H³ of the bottom section of the hood H. A portion of this air is drawn into the blower casing through the opening 18 and is forced outwardly and rearwardly by the rotor through the casing outlets 17. The air in the outlets being under pressure as the result of the action of the rotor flows rearwardly and is conducted by the conduits 19 so that a portion thereof flows directly through the inner or interior portions of the radiator sections 5 and the remainder flows outwardly through the slots H⁵ in the sides H⁴ of the bottom section of the hood H. The portion of the air that flows outwardly through the slots combines with the air that is trapped in the pockets between the sides H⁴ and the inner side walls of the fenders B' and flows rearwardly through the outer or exterior portions of the radiator sections 5. By reason of the fact that air is forced under pressure through the radiator sections the water circulating through the sections from the jacket of the engine B is efficiently cooled.

The herein described cooling system is extremely efficient in operation. Inasmuch as the radiator is in the form of sections at opposite sides of the engine the system is not likely to be seriously damaged in the event the automobile A is involved in a head-on collision. Another feature of employing two radiator sections at the sides of the engine and forcing cooling air through the sections is that the efficiency of the system is such that the sections may be comparatively small in height and hence do not tend unnecessarily to increase the height of the hood of the automobile.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In combination with an automobile having a chassis with wheels and a water jacketed internal combustion engine at the front end thereof and a body on the chassis with a hood over the engine and a pair of fenders spaced outwardly from the sides of the hood and extending over the wheels, a cooling system for the engine comprising a pair of radiator sections connected to the water jacket and positioned on opposite sides of the engine and so that portions thereof are exteriorly positioned with respect to the hood and extend between the sides of the hood and said fenders.

2. In combination with an automobile having a chassis with wheels and a water jacketed internal combustion engine at the front end thereof and a body on the chassis with a hood over the engine and a pair of fenders spaced outwardly from the sides of the hood and extending over the wheels, a cooling system for the engine comprising a pair of radiator sections connected to the water jacket and positioned at opposite sides of the engine and so that they extend through openings in the sides of the hood and have inner portions within the hood and exterior portions between the hood sides and the fenders.

3. In combination with an automobile having a chassis with wheels and a water jacketed internal combustion engine at the front end thereof and a body on the chassis with a hood over the engine and a pair of fenders spaced outwardly from the sides of the hood and extending over the wheels, a cooling system for the engine comprising a pair of radiator sections connected to the water jacket and positioned at opposite sides of the engine and so that they extend through openings in the sides of the hood and have inner portions within the hood and exterior portions between the hood sides and the fenders, and an engine driven means under the hood for circulating air through the inner portions of the radiator sections.

4. In combination with an automobile having a chassis with wheels and a water jacketed internal combustion engine at the front end thereof and also having a body on the chassis with a hood over the engine and a pair of fenders spaced outwardly from the sides of the hood extending over the front wheels, and a cooling system for the engine comprising a pair of radiator sections connected to the water jacket and positioned at opposite sides of the engine so that they extend through openings in the sides of the hood and have inner portions within the hood and have exterior portions between the hood sides and the fenders, and an engine driven blower positioned in front of, and connected for drive by, the engine and having a pair of oppositely disposed rearwardly extending outlets for delivering air under pressure rearwardly through the inner portions of the radiator sections.

5. In combination with an automobile having a chassis with wheels and a water jacketed internal combustion engine at the front end thereof and also having a body on the chassis with a pair of fenders for the front wheels and a hood over the motor provided with sides spaced inwardly from the fenders and embodying apertures therein, a cooling system for the engine comprising a pair of radiator sections connected to the water jacket and positioned at opposite sides of the engine and so that they extend through openings in the sides of the hood and have inner portions within the hood and exterior portions between the hood sides and the fenders, and an engine driven blower disposed in front of the engine and having a pair of oppositely disposed, rearwardly extending, outlets for delivering air under pressure in the direction of said inner portions of the radiator sections so that a portion of the air passes through said inner portions and another portion flows out of the hood via the openings in the sides thereof and passes through the exterior portions of said radiator sections.

6. In combination with an automobile having a chassis with wheels and a water jacketed internal combustion engine at the front end thereof and also having a body on the chassis with a pair of fenders for the front wheels and a hood over the motor provided with sides spaced inwardly from the fenders and embodying apertures therein, a cooling system for the engine comprising a pair of radiator sections connected to the water jacket and positioned at opposite sides of the engine and so that they extend through openings in the sides of the hood and have inner portions within the hood and exterior portions between the hood sides and the fenders, and an engine driven blower disposed at the front of the engine and having a casing with a pair of oppositely disposed, rearwardly extending, outlets for air under pressure, and conduits between the outlets and the inner portions of the radiator sections for conducting the air under pressure from the blower casing to the radiator sections so that a portion of the air passes through said inner portions of the sections and the remainder thereof flows outwardly through said openings in the sides of the hood for passage through the exterior portions of the radiator sections.

7. In combination with an automobile having a chassis with wheels and a water jacketed internal combustion engine at the front end thereof and also having a body on the chassis with a hood over the engine and a pair of fenders spaced outwardly from the sides of the hood and extending over the front wheels, a cooling system for the engine including a pair of radiator sections connected to the water jacket and positioned on opposite sides of the engine and so that portions thereof are exteriorly positioned with respect to the hood and extend between the hood sides and the fenders, and air foils over the exteriorly disposed portions of the radiator sections for deflecting air towards said portions for passage therethrough.

8. In combination with an automobile having a chassis with wheels and a water jacketed internal combustion engine at the front end thereof and also having a body on the chassis with a hood over the engine and a pair of fenders spaced outwardly from the sides of the hood and extending over the front wheels, a cooling system for the engine including a pair of radiator sections connected to the water jacket and positioned on opposite sides of the engine and so that portions thereof are exteriorly positioned with respect to the hood and extend between the hood sides and the fenders, and air foils extending over the exteriorly disposed portions of the radiator sections and between the fenders and the sides of the hood and having curved bottom surfaces for deflecting air towards said exteriorly disposed sections of the radiator sections for passage therethrough.

9. In combination with an automobile having a chassis with wheels and a water jacketed internal combustion engine at the front end thereof and also having a body on the chassis with a hood over the engine and a pair of fenders spaced outwardly from the sides of the hood and extending over the front wheels, a cooling system for the engine comprising a pair of radiator sections connected to the water jacket and positioned at opposite sides of the engine and so that they extend through openings in the sides of the hood and have inner portions within the hood and exterior portions between the hood sides and the fenders, an engine driven blower under the hood for circulating air through the inner portions of the radiator sections, and air foils over the exterior portions of said radiator sections for deflecting air towards said exterior portions for passage therethrough.

10. In combination with an automobile having a water jacketed internal combustion engine and wheels at the front end thereof and also having a body on the chassis with a pair of fenders over the front wheels and a hood over the engine with slotted sides spaced inwardly from the fenders, a cooling system for the engine comprising a pair of radiator sections connected to the water jacket and positioned at opposite sides of the engine and so that they extend through openings in the sides of the hood at a point beyond the slots and have inner portions within the hood and exterior portions between the hood sides and the fender and an engine driven blower disposed in front of the engine and having a casing with a pair of oppositely disposed rearwardly extending outlets, conduits between the outlets and the inner portions of the radiator sections for conducting air from the blower so that a portion thereof passes through said inner portions of the radiator sections and the remainder passes outwardly through said slots in the hood sides and flows to the exterior portions of the radiator sections, and air foils extending over said exterior portions of the radiator sections and between the fenders and the hood sides for deflecting air downwardly through said exterior portions.

11. In combination with an automobile having a chassis with wheels and a water jacketed internal combustion engine and a body on the chassis with a hood over the engine and a pair of wheel fenders positioned outwardly from the sides of the hood, a cooling system for the engine comprising a radiator unit connected to the water jacket and extending through an opening in one of the sides of the hood so that it includes an interior portion within the hood and an exterior portion between said one side of the hood and the adjacent fender.

12. In combination with an automobile having a chassis with wheels and an internal combustion engine and also having a body on the chassis with a hood over the engine and a pair of fenders positioned outwardly of the sides of the hood, a cooling system for the engine comprising a radiator positioned at one side of the engine and having at least a portion thereof disposed between one of the fenders and the adjacent side of the hood.

13. In combination with an automobile having a chassis with wheels and an internal combustion engine and also having a body on the chassis with a hood over the engine and a pair of wheel covering fenders positioned outwardly of the sides of the hood, a cooling system for the engine comprising a radiator positioned at one side of the engine and having at least a portion thereof disposed between one of the fenders and the adjacent side of the hood, and an air foil extending over the radiator means and having a curved surface for deflecting air downwards into the space between said one fender and the adjacent side of the hood for passage through the radiator means.

14. In combination with an automobile having a chassis with wheels and a water jacketed internal combustion engine and a body on the chassis with a hood over the engine and a pair of wheel fenders positioned outwardly from the sides of the hood, a cooling system for the engine comprising a radiator unit connected to the water jacket and extending through an opening in one of the sides of the hood so that it includes an interior portion within the hood and an exterior portion between said one side of the hood and the adjacent fender, and an air foil extending over the exterior portion of the radiator unit and having a curved surface for deflecting air downwards into the space between said one side of the hood and the adjacent fender for passage through the exterior portion of the radiator unit.

AUGUST S. DUESENBERG.